Nov. 26, 1940.   K. CHRIST   2,223,058
ARRANGEMENTS FOR MODULATING HIGH-FREQUENCY OSCILLATIONS
Filed Dec. 17, 1937
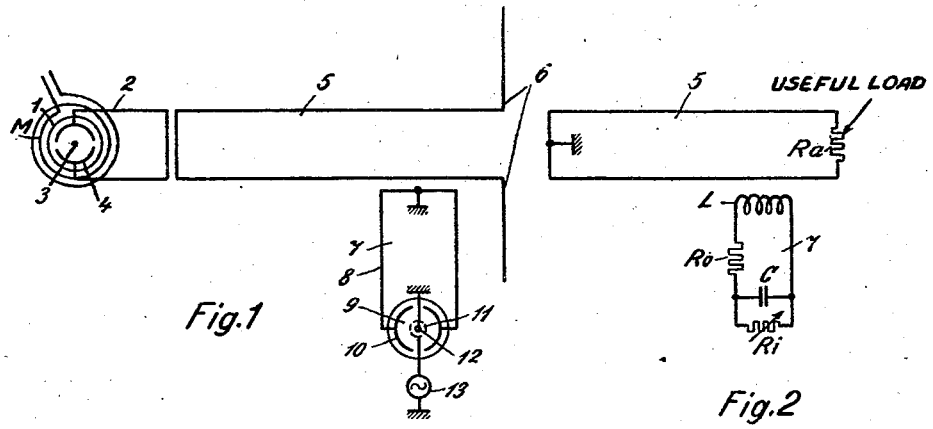
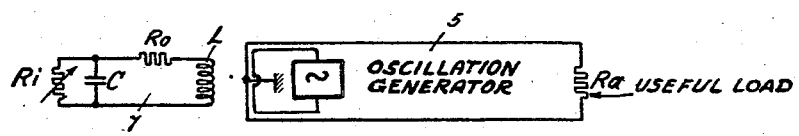
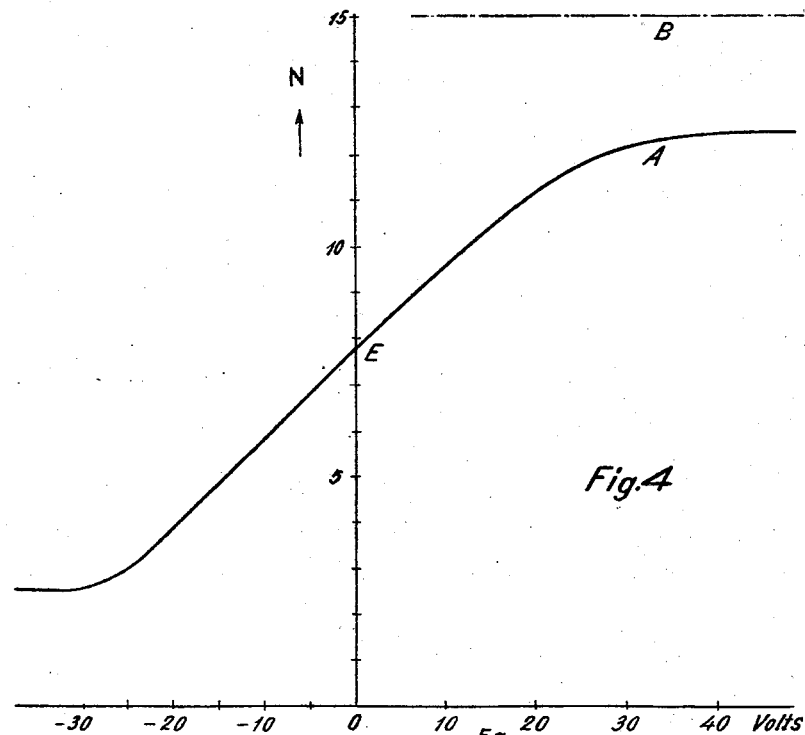
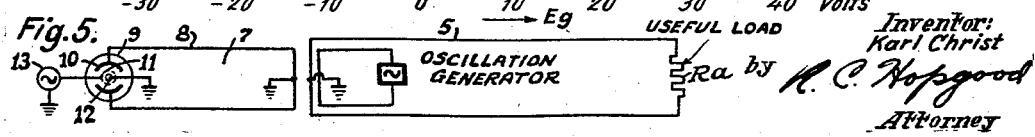
Inventor:
Karl Christ
by R. C. Hopgood
Attorney Patented Nov. 26, 1940

2,223,058

UNITED STATES PATENT OFFICE 2,223,058

ARRANGEMENT FOR MODULATING HIGH-FREQUENCY OSCILLATIONS

Karl Christ, Berlin, Germany, assignor to C. Lorenz Aktiengesellschaft, Berlin-Tempelhof, Germany, a company Application December 17, 1937, Serial No. 180,352
In Germany December 23, 1936

2 Claims. (Cl. 179—171.5)

The present invention relates to arrangements for modulating high frequency oscillations, particularly ultra-short waves.

The modulation of high frequency oscillations, particularly ultra-short waves, requires specific measures, because there is a severe tendency of the oscillation generators employed for this purpose to change their modulation frequencies. It has been proposed to effect modulation by varying the leakage in a Lecher system but the degree of modulation which is to be produced without frequency modulation is rather low. It has also been proposed to employ so-called Habann tubes for varying the leakage, in which case a tube with split anodes is positioned between the Lecher wires, and the discharge space of the tube is influenced by a magnetic field, but the resultant modulation becomes strongly dependent on the anode potential as well as the intensity of the magnetic field, apart from the fact that considerable line expenditure is required. Furthermore, in order to secure ultra-short wave modulation it has been suggested to influence the field of radiation by dipoles, employing vacuum tubes adapted to vary the absorbed energy, but this arrangement introduces the disadvantage that the modulation in the lower range becomes insufficient.

These disadvantages are obviated according to the present invention, which couples an absorption circuit to the oscillation generator in addition to the useful resistance. This absorption circuit, the attenuation of which is varied in dependence upon the modulation is preferably arranged in series with the useful resistance and comprises a glowing cathode tube, the internal resistance of which varies in response to the modulation potential. Actual tests with such an arrangement have proven a very high degree of modulation without appreciable frequency modulation.

The invention will be more readily understood from the following description taken in conjunction with the attached drawing in which:

Fig. 1 diagrammatically shows the circuit arrangement of one embodiment according to the invention in connection with a transmitter; Fig. 2 is an equivalent to the circuit arrangement shown in Fig. 1 and adapted to explain the operation thereof; Figs. 3 and 5 show a modification of the arrangement of Fig. 2; while Fig. 4 illustrates a modulation characteristic obtained according to the invention.

The arrangement of Fig. 1, which by way of an example illustrates a transmitter operating as a Habann generator, comprises a tube 1 forming part of an oscillatory circuit 2, the capacity of which is constituted by the tube capacity. This tube is influenced by a magnetic field, e. g. produced in the coils M, which acts parallel to the cathode 3 and the anode portions 4. This arrangement, as such known in the art, generates ultra-short oscillations with a wavelength of 50 centimeter, for example. These oscillations are inductively transmitted to a Lecher system 5 associated with a radiation dipole 6. A resonance circuit 7 is inductively coupled to the dipole 6, which represents the load resistance of the transmitter, and in series therewith. This resonance circuit comprises a wire bail 8 acting as inductance, and a tube 9, the anode 10 of which consists of two portions which act as effective capacity of the circuit. The tube 9 is also provided with a grid 11 which is mounted concentrically about the cathode 12. The alternating modulation voltages from the source 13 (tone-frequency generator, microphone or the like) are applied to this grid.

The operation of the above described arrangement is hereinafter explained in connection with Fig. 2. A useful resistance $Ra$ which corresponds to the radiational resistance of the dipole 6 is connected to the Lecher system 5 which is the same as shown in Fig. 1. In addition, the oscillatory or absorption circuit 7 is coupled to the Lecher system. L denotes the inductance, and $Ro$ the ohmic resistance of this oscillatory circuit, the capacity of which substantially corresponds to the internal capacity of the tube 9, which is represented by the internal resistance $Ri$. This resistance is varied in dependency of modulation by imparting a modulation voltage upon the grid 11.

The total resistance of this inductively coupled circuit 7 which by virtue of its coupling is serially connected to the resistance $Ra$, is given by the following formula:

$$R_1 = \frac{\omega L_1 . \omega . L . K^2}{G . \frac{L}{C} + Ro}$$

in which:

$R_1$ = the load resistance of the coupled circuit 7;
$\omega$ = the frequency in radians of the prevailing oscillations;
$L_1$ = the inductance of the coupled portion of the Lecher system 5;

L = the inductance of the coupled absorption circuit 7;
K = the coupling factor;
$\frac{1}{G} = Ri$ = the internal resistance of the tube 9; and
C = the capacity of the absorption circuit 7.

If the internal resistance $$\frac{1}{G}$$

of the tube is changed by applying a modulation potential to the grid 11 thereof, also the load resistance R₁ which is serially connected to the useful resistance, is subjected to variation, as will be derived from the formula. This change of the internal tube resistance also causes an attenuation change of the coupled absorption circuit 7, so that the load of the useful circuit follows this attenuation.

In accordance with a further embodiment of the invention shown in Figs. 3 and 5, Fig. 3 being the equivalent circuit of Fig. 5, the absorption circuit 7 is coupled in the point of symmetry of the Lecher system 5, in which case the radiational resistance Ra is subjected to symmetrical load.

According to a further feature of the invention, the absorption circuit may be coupled to the actual oscillatory circuit 2. It will also be possible to perform coupling of the absorption circuit over a third circuit inserted between the oscillatory circuit and the absorption circuit.

Fig. 4 illustrates a modulation characteristic which has been obtained by using an arrangement according to the invention. The output energy N at the dipole is shown in dependence on the modulation voltage Eg which is applied to the grid 11 of the tube. It will be possible by suitably selecting the radius of this grid to provide the point of rest E exactly at zero grid potential. The modulation is preferably effected within the range of the linear portion of the modulation characteristic A. The dash-dotted line B indicates the magnitude of the output energy of the antenna which prevails without employing an absorption circuit. It will easily be seen that the considerable energy decrease which occurs in modulation systems known in the past does not occur.

The use of the coupled absorption circuit involves the further advantage that the cathode of the tube 9 as well as the mid-point of the inductance L may be earthed as shown in Fig. 1. The advantage that the radiation of the coupled circuit is rather small and that the control elements are located at neutral points is the result of this symmetric arrangement. The substantial difference between the modulation according to the invention over the known arrangements is that the modulation tube of the last mentioned devices must absorb the energy which is to be dissipated, while the absorbing action of the modulating tube is substantially avoided according to the application. The aforesaid formula shows that the energy dissipation of the circuit 7 is reduced by increasing the internal tube resistance, while a reduced internal tube resistance results in an increased energy dissipation. This dissipation is effected in the ohmic resistance Ro of the circuit 7. It is furthermore expressed by this formula that a reduced internal resistance $$\frac{1}{G}$$

of the coupled circuit results in an increase of the modulation resistance R₁ which is connected in series with the useful resistance Ra, so that actually a suitable modulation resistance may be secured for each load resistance.

The tube is not necessarily to be provided with a grid for applying the modulation voltage, because this tube is also capable to effect anode-voltage modulation. Furthermore, the method of coupling the absorption circuit is irrelevant and may be effected capacitively or inductively. A tube with split anodes but operating without an additional magnetic field is preferred, but a tube having magnetic field, or a diode or triode tube may readily be employed.

What is claimed is:

1. An arrangement for modulating high frequency oscillations, comprising an absorption circuit acting as a control resistance and having an inductance the symmetry point of which is connected to ground, a useful load resistance, an oscillation generator to which said absorption circuit and load resistance are coupled, an electron discharge tube included in the absorption circuit and having a grid, symmetrically mounted anode portions which are symmetrically connected to said inductance and a cathode which is connected to ground, and means for varying the internal resistance of said tube, so as to vary the attenuation of the absorption circuit.

2. An arrangement for modulating high frequency oscillations, comprising an oscillation generator, a useful load resistance, a Lecher system grounded at the point of symmetry connected thereto and coupled to the oscillation generator, an absorption circuit coupled to the oscillation generator at the point of symmetry of said Lecher system, an electron discharge tube included in said absorption circuit, and means for varying the internal resistance of said tube, so as to vary the attenuation of the absorption circuit.

KARL CHRIST.